United States Patent Office 3,497,328
Patented Feb. 24, 1970

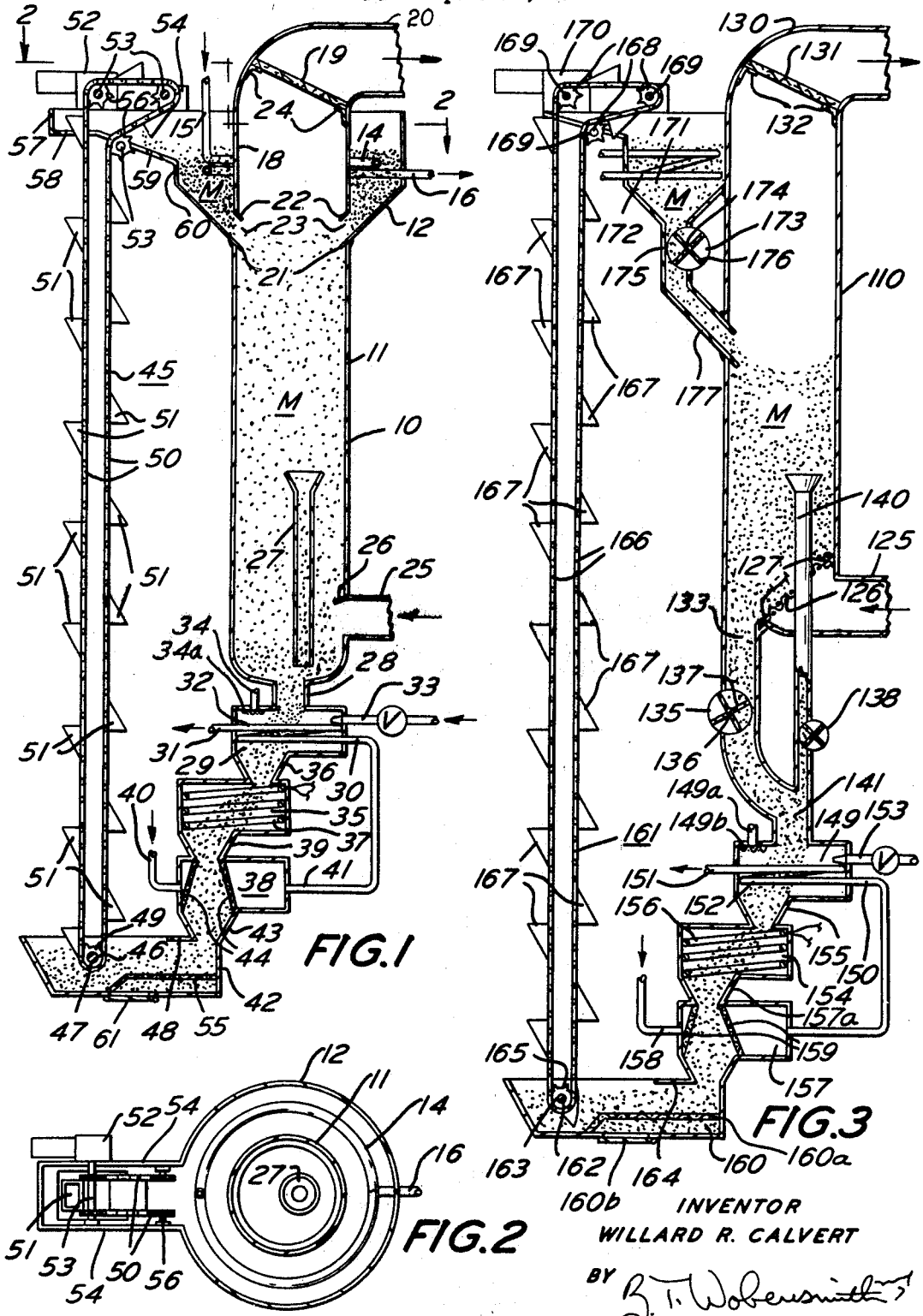

3,497,328
TREATMENT OF CONTAMINATED GASES
AND THE LIKE
Willard R. Calvert, 809 Teakwood Drive,
Severna Park, Md. 21146
Filed Apr. 26, 1966, Ser. No. 545,327
Int. Cl. B01j 9/06, 9/16, 1/22
U.S. Cl. 23—288                           8 Claims

ABSTRACT OF THE DISCLOSURE

Apparatus for treatment of contaminated gases is provided in which a housing is employed to which the contaminated gas is delivered through a gas delivery pipe in counterflow relation and for contact with regenerated solids. A portion of the solids is bypassed around the gas delivery pipe for carrying contaminant gases and vapors away from the gases being decontaminated before displacement by other contaminants. The solids discharged are treated in chambers with aqueous fluid for contaminant removal and with air for water vapor removal and heat transfer.

---

This invention relates to the removal of pollutants from a contaminated stream of gas by use of substances which may or may not be catalytically treated and which permits of recovery of useful waste products and re-use of the catalyst, and its carrier.

The increasing industrialization and population growth has resulted in the dumping of ever increasing amounts of harmful or deleterious substances into the atmosphere. These substances cause physical damage to both animate and inanimate objects, and great expense is required to repair the damage caused. The present systems in use for the removal of these substances before and after they enter the atmosphere are unsatisfactory and uneconomical as they do not permit of a sufficient percentage recovery of salvageable materials to cover the cost of reclaiming them.

Some of the systems in use today employ dust cyclones, filters, electrostatic precipitators and wet scrubbers. These systems are limited in that they remove only certain limited types of pollutants. The filters and dust cyclones remove large particles, the precipitators remove and vapors. None of the prior systems effect a complete removal of pollutants, and with such systems recovery of the material which have a high salvage value is very small.

The principal object of the present invention is to provide apparatus for removing gas borne solid and liquid particles, vapors and contaminating gases from a stream of gases whereby the substances removing them may be re-used many times and a high percentage of the useful materials recovered.

It is a further object of the present invention to provide apparatus for removing gas borne solid and liquid particles, vapors and contaminating gases from a stream of gas wherein the substances removing the pollutants may be solid particles, free flowing in mass and very durable.

It is a further object of the present invention to provide apparatus for removing gas borne solid and liquid particles, vapors and contaminating gases from a stream of gas wherein the substance removing the pollutants is solid particles of small diameter and great surface area per unit of weight.

It is a further object of the present invention to provide apparatus for removing gas borne solid and liquid particles, vapors and contaminating gases from a stream of gas where the substance removing the pollutants may be porous solid particles treated with suitable catalysts so that catalyzed reaction with the materials to be removed is obtained.

It is a further object of the present invention to provide apparatus for removing gas borne solid and liquid particles, vapors and contaminating gases from a gas stream where the substance used to remove the pollutants catalytically treated or not as desired, may be returned to its initial state and re-used many times.

It is a further object of the present invention to provide apparatus for removing gas borne solid and liquid particles, vapors and contaminating gases from a gaseous stream which can be utilized for a variety of contaminants and either hot or cold cleaning substances can be supplied as desired.

Other objects and advantageous features of the invention will be apparent from the description and claims.

The nature and characteristic features of the invention will be more readily understood from the following description taken in connection with the accompanying drawings forming part thereof, in which:

FIGURE 1 is a diagrammatic cutaway view showing one form of apparatus in accordance with the present invention;

FIG. 2 is a horizontal sectional view taken approximately on the line 2—2 of FIG. 1; and FIG. 3 is a diagrammatic cutaway view of an alternate structure in accordance with the present invention.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings and specifically FIGS. 1 and 2 thereof, the apparatus of the present invention is therein shown diagrammatically. The apparatus includes an outer casing 10 of generally cylindrical shape and having a straight cylindrical middle portion 11. The casing 10 at its upper portion thereof has an integral funnel shaped conduit 12 thereon for the introduction of material M with which the gaseous stream is to be bombarded. A coil pipe 14 is shown extending around the inside of the funnel 12 suitable for carrying coolant around the inside of funnel 12 and with a coolant intake 15 and coolant exhaust 16. The funnel 12 filled with gas cleansing substance M around its outside edges, has a gas discharge conduit 18 in the center of the funnel 12 of smaller diameter than the funnel 12 and at a distance above its inner edge that is determined by the type and quantity of contaminant to be removed, the height of the central portion 11, its diameter and the kind of cleansing substance M to be used.

The solid particles of substance M flowing through the opening so made between conduit 18 and funnel 12 are of great number and of greater surface area than will be covered by the contaminating materials to be removed from the gaseous stream.

Substances M which may be employed as solid particles for contaminant removal are chosen according to the task requirements. If for example, finely dispersed liquids and particulate solids are the only materials to be removed from the gaseous stream, then ordinary sand or sandy earth may be used. If vapors in a warm gaseous stream are to be removed as dispersed liquid condensates then cooled sand is used.

If gases and vapors such as water vapor are to be removed then substances composed of alumina particles may be utilized. Such particles are more fully described in U.S. Patents Nos. 3,177,151 and 3,214,388. Patent No. 3,177,151 describes a process for producing spherical catalyst pellets of a mixture of AlO(OH), $Al_2O_3$ and $H_2O$ with an aluminum phosphate binder. These pellets can absorb 100 gms. of $H_2O$ more or less per pound of pellets.

Patent No. 3,214,388 describes a method of forming metal oxide catalytic pellets including $Al_2O_3$ but also other metals and their oxides such as magnesium, iron, manganese, chromium, nickel, zinc, calcium, barium, potassium, lead, and beryllium may be substituted for $Al_2O_3$.

Other substances which may be used are alkalioxide alumina-silicates, alkali metal salts, refractory metal oxides, carbon, and many other suitable materials some of which are adsorbent and capable of catalyzing oxidation of organic coatings collected thereon when treated with heat during regeneration which serve as molecular sieves and as adsorbents for gas and vapor contaminant removal as well as solid and liquid particulate removal.

The gas discharge conduit 18 extends vertically upwardly and is provided with a perforate screen and filter 19 retained therein by clips 24, the filter 19 extending around the inside of conduit 18 and with perforations of suitable size so as to prevent the substance M from passage therethrough but not restricting the flow of cleansed gas. The conduit 18 extends around a corner bend and terminates in a horizontal portion 20 for discharge of the cleansed stream into the atmosphere, to another treatment apparatus, or other disposition as desired.

The material M in funnel 12 passes down into the casing 10 between an inwardly extending downwardly inclined baffle 21 in the casing 10 and a similar baffle plate 22 on the gas discharge conduit 18. A throat 23 controlling passage of substance M is formed thereby between the baffles 21 and 22. Its size is a function of the height of the conduit 18 above the funnel 12.

The casing 10 at its lower portion has a gas delivery conduit 25 therein for delivery into the casing 10 of a contaminated stream of gas to be decontaminated. A deflector baffle 26 extends inwardly and downwardly of the conduit 25, integral therewith and serves to prevent the downwardly falling substance M from entering the conduit 25. A hollow tube 27 is provided inwardly of conduit 10 for removing contaminated particles within casing 10 upwardly of conduit 25, said tube 27 extending vertically upwardly of a height and size to be determined according to the types of contaminants to be removed. At the bottom of the casing 10 is a discharge pipe 28 of reduced diameter for the gravity delivery of contaminated cleansing material M into a first treatment chamber 29. The treatment chamber 29, of cylindrical shape, is provided with an air intake tube 30 for the passage of a stream of hot air through a heat exchanger coil 32 and out a discharge tube 31. The heat from the hot air in the coil 32 will serve to heat the contaminated substance M and vaporizable substances will be driven off and escape through perforate grid 34a and tube 34 for treatment as desired.

An aqueous fluid, i.e. water or steam, intake nozzle 33 is shown in chamber 29 and is utilized to provide a source of water in streams or drops, or steam, to wash off contaminants from the contaminated material M should they be amenable to such treatment.

Directly below the first treatment chamber 29 is a second treatment chamber 35. The chamber 35 is connected to the chamber 29 by a short tube 36 of funnel shape, restricted at its bottom where it connects to chamber 29 and acting to slow down the speed of downward movement of the material M.

The second treatment chamber 35 of cylindrical shape is shown provided with an electric heating coil 37 for further heating of the material M in order to drive or burn off contaminants and activate the substance M if it is adsorbent.

A third treatment chamber 38 is provided below the chamber 35 and connected thereto by a funnel shaped tube 39 similar to tube 36 and of restricted diameter where it enters chamber 38. The chamber 38 is shown equipped with a source of cold (ambient) air 40 and hot air outlet 41 through which hot air emerges after passing through the hot material M contained between perforate grids 44. This hot air is carried through conduit 30 into the coil 32 transferring heat into material M in chamber 29.

Directly below the chamber 38 is a hopper 42 into which the cleaned heated and cooled material M is discharged by way of connecting funnel 43. The hopper 42 is provided with a sieve 55 at the bottom thereof to separate off small particles of substance M that are not suitable for re-use and which can be removed from hopper 42 by a door 61 in hopper 42.

A conveyor system 45 is provided in hopper 42 with its lower shaft 46 journaled in bearings 47 in side walls 48 of the hopper 42. The conveyor 45 includes sprockets 49 carried on the shaft 46 engaged with an endless belt or chain 50 carrying a multiplicity of scoops or buckets 51 thereon. The conveyor system 45 extends vertically upwardly to above the funnel 12 of the casing 10 and is attached to an extension 52 of the funnel 12. The conveyor 45 at the top is provided with shafts 53 engaged in the walls 54 of the funnel extension 52.

The shafts 53 have sprockets 56 thereon engaged with the chain 50 for carrying and advancing the chain 50.

Suitable driving means (not shown) is provided for driving the chain 50 with its scoops 51 through shafts 53 and sprockets 56.

The extension 52 of funnel 12 has a vertical upwardly extending rim 57 with horizontal plate 58 connected thereto and integral therewith and a downwardly inclined portion 59 is engaged with plate 58 and vertical rim 60 of the funnel 12.

When contaminated gas is to be treated the substance M in the funnel 12 is started flowing out throat 23 into casing 10. The substance M is particulate and can be any one of the substances previously described suitable for removal of the particular contaminants as contaminants in the gas to be treated. The substance M is impelled down the casing 10 by gravity and is discharged from the bottom through pipe 28. A contaminated stream of gas is introduced through conduit 25 into casing 10. The gas is at low pressure and flows vertically upwardly in casing 10, through screen and filter 19, conduit 18 and out portion 20. During its upward passage the gas is bombarded with substance M and the contaminants in the gas are removed and carried out by the substance M through the pipe 28.

The substance M with contaminants is carried into chamber 29 by pipe 28. While in chamber 29 the contaminated material M is heated by coil 32 and washed by water or steam from source 33. Hot air from intake 30 passes through coil 32, and passes out air outlet 31 while vapors and gaseous contaminants removed from the substance M by the heat and water treatments emerge or are pumped off through outlet tube 34 after passing through perforate grids 34a.

The substance M passes into second treatment chamber 35 where it may be further heated by heater coil 37 and then passes out through pipe 39 into chamber 38. Cold air is blown across the substance M while between perforate grids 44 in chamber 38 cooling material M and heating the air which exits chamber 38 through pipe 41.

The cleaned and dry substance M then falls into hopper 42 where dry fine solid particles are separated from substance M by sieve 55 which vibrates substance M, and large particles are picked up by buckets 51 on chain 50 of conveyor assembly 45 and transported to the funnel 12 for re-use and introduction into casing 10, the smaller particles passing through sieve 55 where they may be removed through door 61. While in funnel 12 the substance M may be cooled by coolant in pipe 14 if desired.

An alternate form of apparatus is illustrated in FIG. 3, wherein certain types of contaminated gases are treated by forcing the gas through compacted cleansing substance in the apparatus at high pressure rather than through slight concentration at low pressure as used in FIGS. 1 and 2. The apparatus of FIG. 3 includes a vertical outer casing 110 similar to casing 10 and of substantially cylindrical shape. The casing 110 at the lower portion thereof has a gas conduit 125 attached thereto for delivery of contaminated gas for cleaning into the interior of the casing 110. A foraminous grid 126 is provided at the entrance portion of delivery pipe 125, and secured therein by projections 127 on the end of the pipe 125. The grid 126 is permeable and permits gas to pass therethrough into the interior of the casing 110 but prevents the contents from passage back out through grid 126 and pipe 125. The casing 110 at the top thereof has an exhaust portion 130 attached thereto and integral therewith for the discharge of treated gas as desired. A screen and filter 131 is provided at the top of casing 110 closing the portion 130 and retained therein by projections 132. The filter 131 is of sufficient permeability so as to permit treated gas to pass therethrough and into the exhaust pipe 130 but sufficiently restrictive to prevent the passage of solid contents from casing 110.

At the lower portion of casing 110 a discharge pipe 133 is provided to receive the contaminated contents of casing 110 for conveyance for treatment.

A rotary impeller valve 135 is provided in the discharge pipe 133 to reduce the rate of flow of contaminated substance M from the casing 110 and has a plurality of trap chambers to permit delivery of material and prevent flow of gases through pipe 133. The valve 135 is of conventional type and includes a shaft 136 carried in pipe 133 and radially extending vanes or impellers 137 attached to shaft 136 and at horizontal engagement effectively regulating movement of material M in pipe 133 and sealing off gas flow thereby.

A second discharge pipe 140 is provided extending vertically upwardly in casing 110 and into the material M to receive material contaminated by certain types of contaminants which are removed at a higher level than others. Usually the contaminants removed here are gaseous whereas those removed at the lower levels are liquids and solid particles.

The pipe 140 extends downwardly and has a trap chamber and impeller valve 138 of the same type as valve 135 contained therein and joins with pipe 133 forming a discharge channel 141. The channel 141 empties into a first treatment chamber 149 similar to chamber 29 which is provided with a heat exchanger 152 connected to a source of hot air under pressure. The air under pressure enters through an air inlet pipe 150 and passes through heat exchanger coil 152 to and through an outlet pipe 151. The chamber 149 may also have a water or steam pipe 153 which is utilized as in FIG. 1 to treat the contaminated material M received in the chamber 149 in the same manner as described with respect to FIGS. 1 and 2. Vapors driven off from the substance M flow through an air outlet tube 149a which is provided with a preforated grid 149b.

A second treatment chamber 154 is provided below chamber 149 connected thereto by funnel 155, of similar configuration as chamber 35, and provided with an electric heater element 156 as desired.

A third treatment chamber 157 is provided below chamber 149 connected thereto by funnel 157a and of construction similar to chamber 38 with an inlet source of cold air 158 which air passes over th substance M in chamber 157. The substance M is held between perforate grids 159 to the air passing out through outlet pipe 150 to chamber 149 as described.

The chamber 157 is connected to hopper 160, which hopper 160 has a conveyor assembly 161 therein. A sieve 160a is provided in the bottom of hopper 160 to separate off small particles of substance M which can then be removed through door 160b in hopper 160. The conveyor 161 extends vertically upwardly from hopper 160, similar to conveyor 45, and is provided with a shaft 162 which is journaled in bearings 163 in hopper walls 164. Sprockets 165 are provided on shaft 162 engaged in an endless belt or chain 166 supported and driven by chain 166.

The chain 166 extends vertically upwardly and has a multiplicity of buckets 167 attached thereto and carried thereby. The chain 166 is supported and driven at its upper end by sprockets 168 on shafts 169 engaged in portion 170 of a delivery chute 171.

Driving mechanism (not shown) is provided to drive the shafts 169, sprockets 168 and chain 166. The delivery chute 171 is of funnel shape and has a coolant conveyor pipe 172 therein to provide a cooling effect on the cleansed material M contained therein as desired. The chute 171 has tube 175 at the bottom thereof with trap chamber and impeller valve 173 therein which impedes and regulates the flow of substance M out of the tube 175.

The valve 173 has a central shaft 174 which is journaled in a tube 175 attached to chute 171 with radially extending vanes 176 attached to shaft 174 and free to rotate with shaft 174.

A lower delivery pipe 177 is provided attached to and integral with tube 175 extending into the housing 110 for delivery of material M to be used as a cleaning agent in the casing.

In order to cleanse a contaminated stream of gas the casing 110 is first supplied with a compacted mass of cleaning substance M of similar type as used in casing 10 of FIGS. 1 and 2. The substance M is introduced by pipe 177 into casing 110 from hopper 171 and its flow therein is regulated by valve 173. The substance M is discharged at a predetermined rate to enable it to keep the casing 110 filled to the pipe 177. The substance M flows into the pipe 140, and fills up pipe 140, its discharge being regulated by valve 138. The substance M is prohibited from flowing into pipe 125 by the grid 126. The substance M fills up lower pipe 133 and its discharge therefrom is regulated by valve 135. A contaminated stream of gas is introduced at high pressure into casing 110 by pipe 125, the gas flows upwardly through M depositing its contaminants on M and passing to the outside through screen 131 and discharge conduit 130.

The contaminated material flows down pipe 140 past valve 138, and into channel 141. Additional contaminated material flows through pipe 133 past valve 135 and into channel 141. From channel 141 the material enters the first treatment chamber 149 where it undergoes treatment as in chamber 29 of FIG. 1. The material passes through pipe 155, chamber 154, chamber 157 and into hopper 160, the contaminated material receiving treatment as it did in chambers 35 and 38 of FIG. 1. From the hopper 160 the cleansed dry and cooled substance M is carried to hopper 171 by buckets 167 of conveyor 161 similar to conveyor 45 of FIG. 1. The cleaned substance M, while in hopper 171, can be further cooled as before by coolant in pipe 172. The substance M is then discharged into casing 110 through pipe 175, pipe 177, valve 173 and the cycle is repeated.

It will thus be seen that apparatus is provided for effectively carrying out the objects of the invention.

I claim:
1. Apparatus for decontaminating gases comprising
an outer housing,
a contaminated gas delivery pipe connected in spaced relation to one end of said housing for delivery of contaminated gas to said housing for decontamination of said gas,
a source of regenerated particulate solids material connected to the other end of said housing for delivery of said solids material thereinto for contact by the contaminated gas and its contaminants in said housing, means associated with said source for controlling the temperature of the regenerated solids material delivered to said housing,
treated gas discharge means connected to the other end of said housing,
contaminant burdened solids material discharge means at said one end of said housing,
said housing having a contaminant burdened solids receiving member therein separating, with respect to said gas delivery pipe, a portion of said solids material carrying therein contaminant gases and thereby isolating said burdens from the gases being decontaminated,
contaminant burdened solids regenerating means separated from said outer housing for regeneration of said burdened solids material including chambers connected to said material discharge means,
said solids regenerating means having a fluid discharge connection for removal therethrough from the apparatus of gas and vapor contaminant burdens, and
conveyor means for conveying regenerated solids material to said source from said regenerating means.

2. Apparatus as defined in claim 1 in which said solids regenerating means chambers are provided with a heater and with a source of aqueous fluid for removal through said discharge connection of said gas and vapor contaminant burdens.

3. Apparatus as defined in claim 1 in which said solids regenerating means chambers are provided with a connection thereto of a source of air for removal of residuals including water vapors and for heat transfer.

4. Apparatus as defined in claim 1 in which said solids regenerating means are provided with a sieve for separation of fines from said solids material.

5. Apparatus as defined in claim 1 in which a particulate solids material retaining material member is provided between said housing and said treated gas discharge means.

6. Apparatus as defined in claim 1 in which a trap chamber device is interposed between said source and said housing.

7. Apparatus as defined in claim 1 in which said contaminant burdened solids receiving member has a flow control member interposed therein.

8. Apparatus as defined in claim 1 in which said contaminant burdened solids discharge means has a flow controlling means interposed therein.

References Cited

UNITED STATES PATENTS

| | | | |
|---|---|---|---|
| 1,836,301 | 12/1931 | Bechthold | 55—79 X |
| 2,379,195 | 6/1945 | Simpson et al. | 23—260 |
| 2,544,214 | 3/1951 | Berg | 55—390 X |
| 2,616,829 | 11/1952 | Berg | 55—390 X |
| 2,719,206 | 9/1955 | Gilmore | 55—390 X |
| 2,519,873 | 8/1950 | Berg | 55—61 |
| 2,550,955 | 5/1951 | Berg | 55—61 |
| 2,609,887 | 9/1952 | Berg | 55—61 |
| 2,679,540 | 5/1954 | Berg | 55—61 X |

FOREIGN PATENTS 666,715    2/1952    Great Britain.

JOSEPH SCOVRONEK, Primary Examiner

U.S. Cl. X.R.

23—2, 260; 55—390

UNITED STATES PATENT OFFICE
CERTIFICATE OF CORRECTION

Patent No. 3,497,328  Dated February 24, 1970

Inventor(s) WILLARD R. CALVERT

It is certified that error appears in the above-identified patent and that said Letters Patent are hereby corrected as shown below:

Column 1,

Between lines 46 and 47, - smaller ones and the wet scrubbers remove certain gases - has been omitted.

Column 5,

Line 60, before "grid", "preforated" should read - perforated - ,

Line 67, before "substance", "th" should read - the - .

Column 6,

Line 37, - downwardly - should be inserted after "flows".

SIGNED AND
SEALED
JUL 21 1970

(SEAL)
Attest:

Edward M. Fletcher, Jr.
Attesting Officer

WILLIAM E. SCHUYLER, JR.
Commissioner of Patents